Oct. 10, 1939.    C. M. EASON    2,175,382
HOIST CLUTCH AND BRAKE MECHANISM
Filed June 18, 1937    5 Sheets-Sheet 1

Inventor
Clarence M. Eason
By Brown, Jackson, Boettcher & Dienner
Attys

Oct. 10, 1939.  C. M. EASON  2,175,382
HOIST CLUTCH AND BRAKE MECHANISM
Filed June 18, 1937  5 Sheets-Sheet 4

Inventor
Clarence M. Eason
By Brown, Jackson, Boettcher & Dienner
Attys

Oct. 10, 1939.                C. M. EASON                2,175,382
                    HOIST CLUTCH AND BRAKE MECHANISM
                     Filed June 18, 1937        5 Sheets-Sheet 5

Inventor
Clarence M. Eason
By Brown, Jackson, Boettcher & Dienner
Attys

Patented Oct. 10, 1939

2,175,382

UNITED STATES PATENT OFFICE 2,175,382

HOIST CLUTCH AND BRAKE MECHANISM

Clarence M. Eason, Waukesha, Wis., assignor to Industrial Clutch Company, Waukesha, Wis., a corporation of Wisconsin Application June 18, 1937, Serial No. 148,845

38 Claims. (Cl. 192—4)

The present invention relates to a combined clutch and brake mechanism which has its principal field of utility in connection with hoists, winches and other machines handling a gravity impelled load or other continuously acting, unidirectional load. However, as I shall later describe, this improved clutch and brake mechanism can also be employed in other machines wherein the load is not continuously acting or wherein the load may act in opposite directions.

In operating a hoist to raise, hold and lower a gravity load, it is of the utmost importance that the load be prevented from accidentally dropping. Loss of control of the hoisting drum, even for only a moment, can be very hazardous to life and equipment. This requires that a reliable control be exercised over the clutch and brake of the hoist. Furthermore, the control must be sufficiently delicate to provide for accurate movement of the load, and also to avoid the possibility of stalling the source of power. For example, where the hoist is holding a suspended load at one level with the brake set, and it is desired to raise the load to a predetermined higher level and to hold it there for a short time and then to lower it at a controlled speed, it is necessary to perform at least three distinct control operations of the clutch and brake devices. The first operation of starting the transmission of power to the load requires that the clutch and brake be so operated that the clutch takes hold of the load before the brake lets go of the load. The second operation of stopping the transmission of power to the load and holding the load at the predetermined higher level requires that the brake and clutch be so operated that the brake takes hold of the load before the clutch lets go of the load. In the third operation of lowering the load at a controlled speed, the brake must be released just sufficiently to permit lowering of the load but to keep it under control.

Heretofore, the general practice has been to have the clutch and the brake each responsive to a separate control lever, and to rely upon the operator's skillful manipulation of these two levers to obtain the desired reliability and delicacy of control. One objection to this practice is that it leaves the reliability of control entirely open to human error, particularly in the selective operation of the two levers when starting and stopping the transmission of power to the load. Another objection is that the necessity of having to selectively actuate two levers adds to the duties necessary to be performed by the operator, which may be very numerous in some machines, such as power excavators, where control operations over different mechanisms have to be performed in close sequence.

Prior attempts to place the brake and the clutch both under the control of a single lever have not proven satisfactory. In one typical prior construction, when the control lever is in one extreme position the clutch is engaged and the brake is released, and when the lever is in the other extreme position the clutch is released and the brake is engaged. However, in shifting from one position to the other, the lever necessarily passes through a neutral or intermediate position where the hoisting drum is disconnected from both the clutch and the brake and hence is free to drop the load. Even though the shift is made with great rapidity, the momentary loss of control of the drum when the lever passes through this free neutral position is sufficient to make such a device impracticable for most hoist situations.

The general object of the present invention is to provide improved clutch and brake mechanism in which an interdependent relation exists between the clutch and brake functions in the operations of starting and stopping the transmission of power to the load, but in which the brake function is made independent of the clutch function for the operation of lowering the load at a controlled speed. That is to say, in starting the transmission of power, the release of the brake surfaces is made directly dependent upon the prior engagement of the clutch surfaces, and, in stopping the transmission of power, the release of the clutch surfaces is made directly dependent upon the prior engagement of the brake surfaces. However, for lowering the load, the brake surfaces can be released independently of the engagement of the clutch surfaces. By virtue of the interdependent relation between the clutch and brake operations, it is functionally impossible to lose control of the hoisting drum between the engaging of the clutch surfaces and the releasing of the brake surfaces, or between the engaging of the brake surfaces and the releasing of the clutch surfaces.

Another object of the invention is to provide such a clutch and brake mechanism in which the interdependent relation of the clutch and brake functions is obtained by the use of a spring loaded, axially shiftable driven member which is caused to shift into and out of engagement with a brake member in accordance with the operating positions of a shiftable driving member.

Another object of the invention is to provide such a clutch and brake mechanism in which all of the control operations are performed by relative axial shifting movements between driving, driven and brake members.

Another object of the invention is to provide such a clutch and brake mechanism in which all of the control operations can be performed through the instrumentality of a single control lever.

Another object of the invention is to provide such a clutch and brake mechanism in which the driving, driven and brake members are in the form of coacting cones.

Another object of the invention is to provide such a clutch and brake mechanism in which the brake surfaces exert a braking force against either direction of rotation of the driven member. Hence, this clutch and brake mechanism can be employed to handle a load which may act in either direction.

Other objects and advantages of the invention will appear from the following detail description of certain preferred embodiments of the invention. In the accompanying drawings illustrating such embodiments.

Figures 1, 5:
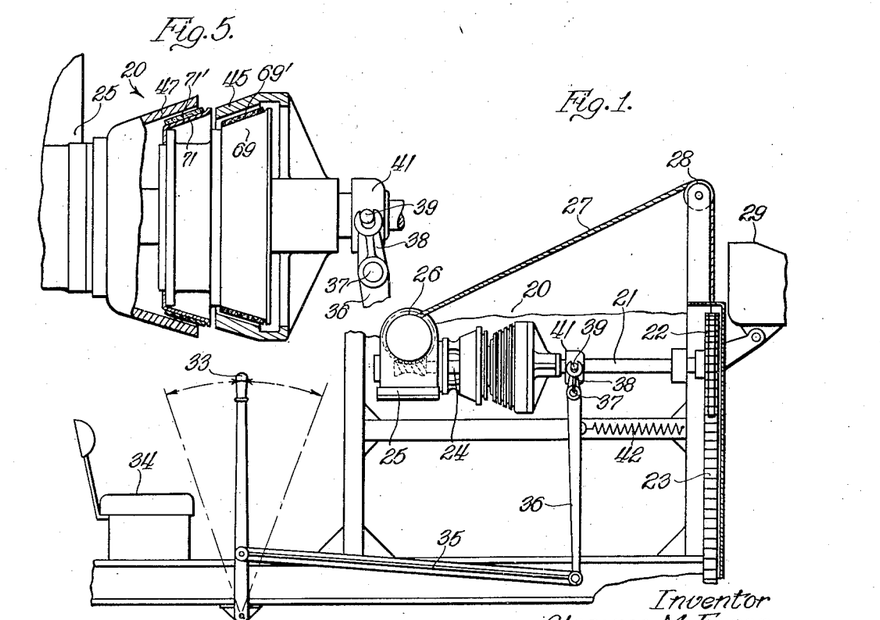
Figure 1 is a diagrammatic view illustrating a typical installation of my improved clutch and brake mechanism in a shovel hoist.
Figures 3, 4 and 5 are diagrammatic views illustrating the operation of the mechanism.

Referring to Figure 1, the clutch and brake mechanism designated 20 in its entirety is adapted to receive power through a drive shaft 21 which may have any suitable connection with the source of power, such as through the sprocket wheel 22 and chain 23. A driven shaft 24 extends from the clutch and brake mechanism into a gear housing 25 containing any suitable speed reducing gearing for transmitting a drive to the hoisting drum 26. Winding on said drum is a hoisting cable 27 which passes over an upper sheave 28 and has attachment at its other end to the load, indicated at 29. In the exemplary installation shown, the load 29 consists of a shovel which is adapted to be raised and lowered by the hoisting mechanism, but it will be understood that this load is merely illustrative.

Control of the clutch and brake mechanism is effected through a control lever 33 disposed adjacent to the operator's seat 34. A link 35 is pivotally connected between this lever and the lower end of a lever 36 which has its upper end keyed to a rock shaft 37. Said rock shaft has forked arms 38 extending upwardly therefrom for embracing pins 39 projecting laterally from a thrust collar 41 at the end of the clutch and brake mechanism.

A light tension spring 42 connected between the lever 36 and any suitable point on the frame of the machine serves to normally hold the control mechanism in neutral position with the brake engaged and the clutch disengaged.

Figure 2:
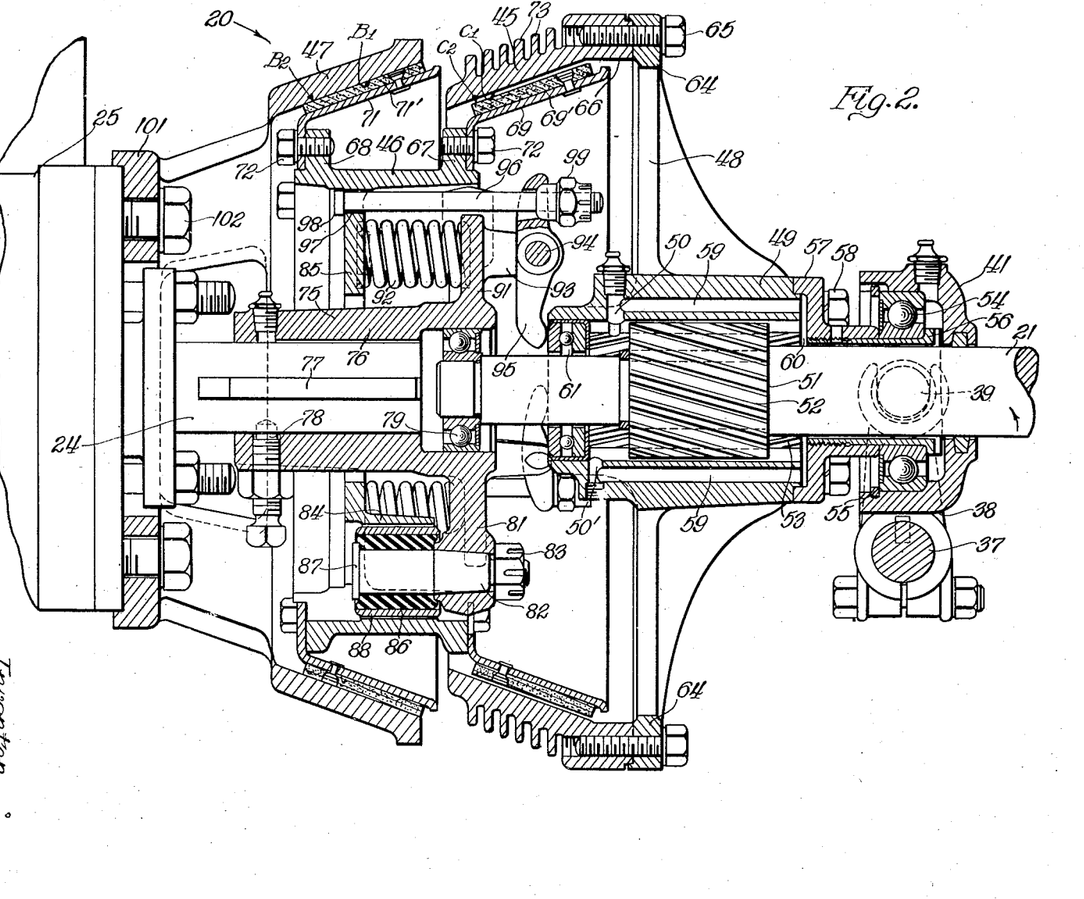
Figure 2 is an axial sectional view through such embodiment of my improved clutch and brake mechanism.

Referring to Figure 2, the clutch and brake functions are performed by the driving member 45, the driven member 46 and the brake member 47. Driving rotation is transmitted from the shaft 21 to the driving member 45 through a spider 48. The hub 49 of said spider engages over a driving sleeve 51 which is rigidly secured to the drive shaft 21. Formed in said sleeve are helical splines or teeth 52 which engage between corresponding helical splines or teeth 53 formed within the hub 49. This driving relation permits the spider to be shifted axially along the shaft, and also results in the torque of the driving shaft assisting in forcing the clutch surfaces together after initial engagement thereof, as will hereinafter appear. Shifting motion is transmitted from the thrust collar 41 to the spider hub 49 through an anti-friction thrust bearing 54 which has its race secured within the thrust collar by a snap ring 55. The inner race of said bearing is mounted on a sleeve 56 which is secured to an end cap 57 fastened by screws 58 to the hub 49. Longitudinal passageways 59 in the hub establish communication with opposite ends of the splined bore of the hub through ports 50, 50' and through a space 60 defined between the end cap 57 and the adjacent end of the hub. These passageways permit the transfer of lubricant from one end of the splined bore to the other as the hub is shifted along the driving sleeve 51, so that shifting motion will not be impeded by the trapping of lubricant. The other end of the hub 49 carries an anti-friction thrust bearing 61 which transmits thrusting pressure to the levers which serve to release the driven member 46 from engagement with the brake member 47, as will be later described. Thus, the hub 49 constitutes in effect a shiftable control member for governing the engagement and release of the clutch and brake surfaces. The spider 48 is provided with a peripheral flange 64 which is secured by bolts 65 to a laterally extending flange 66 on the clutch member 45.

Radial flanges 67 and 68 extending from opposite ends of the driven member 46 have cones 69 and 71 secured thereto by screws 72. The cone 69 has a friction facing 69' secured thereto for cooperating with the inner surface of the driving cone 45, and the other cone 71 has a similar friction facing 71' secured thereto for cooperating with the inner surface of the brake cone 47. The coacting clutch surfaces $C^1$ and $C^2$ constitute the clutch portion of the mechanism, and the coacting brake surfaces $B^1$ and $B^2$ constitute the brake portion of the mechanism. Heat radiating flanges 73 are formed on the driving cone 45, and, if desired, like flanges may also be formed on the brake cone 47.

The driving member 46 is mounted for endwise floating or shifting movement on a supporting member 75 comprising a hub 76 which is rigidly secured to the driven shaft 24 by the splines 77 and set screw 78. Mounted in the end of this hub 76 is an anti-friction pilot bearing 79 for the inner end of the driving shaft 21. Projecting from the hub 76 at equidistantly spaced points are arms 81 which carry the studs 82 for connecting the supporting member 75 with the driven member 46, there preferably being three of said studs 82. The studs have a tapered fit in tapered openings in the arms 81, and are secured to the arms by means of lock nuts 83. The opposite ends of the studs 82 extend into the openings in tubular bosses 84 formed integral with a web 85 extending inwardly from the driven member 46. Deformable resilient bushings 86 of rubber or other suitable material are disposed in the openings in the bosses 84 for transmitting torque between the driven member 46 and supporting member 75. The outer ends of the studs 82 are headed or flanged at 87 to hold the bushings 86 in place on the studs and between the headed ends of the studs and the arms of the supporting member 75. Surrounding the resilient bushings 86 are metal sleeves 88, the rubber of the bushings being pressed into firm engagement with the inner surfaces of these sleeves. The bosses 84 have a free sliding fit over the metal sleeves 88 so that shifting motion of the driven member can be accommodated by relative sliding motion between these parts. Under heavy torque load, when the friction in the metal-to-metal contact between the sleeves and bosses may be increased considerably, some or all of the shifting movement of the driven member can be accommodated within the rubber bushings themselves, by flexure or intermolecular yielding of the rubber. The rubber bushings also permit the driven member 46 to have a sufficient degree of rocking or tilting movement to accommodate any angular misalignment between the cones 69, 71 of said driven member and the clutch cone 45 and brake cone 47. In my copending applications Serial No. 731,614, filed June 21, 1934, and Serial No. 23,558, filed May 27, 1935, I have shown other structures in which the intermolecular yielding of rubber bushings is utilized to accommodate relative shifting movement under torque load, and also to accommodate misalignment of parts.

Interposed between the web 85 of the driven member 46 and an annular flange 91 on the supporting member 75, are a plurality of compression springs 92 which have their ends seating in recesses in said web and flange. These springs apply a loading pressure to the driven member 46, normally tending to shift said driven member toward the left for bringing the cone 71 into engagement with the brake cone 47. Projecting outwardly from the annular flange 91 at angularly spaced points are lugs 93 which carry pivot pins 94 on which levers 95 are rockably mounted, there preferably being three of these levers. The inner arms of said levers extend into proximity to the end race of the anti-friction thrust bearing 61 mounted in the spider hub 49, so that upon endwise shifting motion of said hub toward the left this race of the thrust bearing 61 engages and transmits motion to the inner arms of the levers 95. The outer arms of said levers are apertured to have pull rods 96 extend therethrough. The other ends of said rods pass freely through holes 97 in the web portion 85 of the driven member 46, and have heads 98 thereon for abutting the outer side of said web portion. Adjusting nuts 99 screw over the opposite ends of the rods 96 and abut the front sides of the levers 95. These nuts are so adjusted that the full pressure of the springs 92 is normally effective for holding the cone 71 of the driven member 46 pressed firmly against the brake cone 47. Wear occurring in the friction facings 69' and 71' can be compensated for by adjusting these nuts to retain the levers 95 in their proper normal positions.

Formed integral with the brake cone 47 is a base portion 101 which is stationarily attached to the gear housing 25 by the bolts or screws 102.

Figure 3:
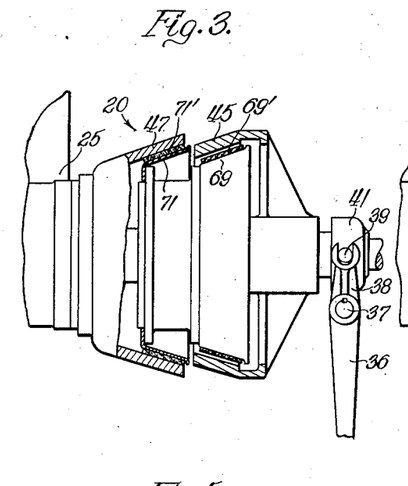

Referring now to the operation of this embodiment of my invention, when the operator's control lever 33 is in the neutral, intermediate position illustrated in Figure 1, the driving and driven members 45 and 46 occupy the relative positions shown in Figure 2. In this position, the driving member 45 is spaced out of contact with the cone 69 of the driven member 46, so that the clutch surfaces are disengaged. However, the springs 92 acting on the driven member are holding the other cone 71 of said driven member pressed against the brake cone 47 so that the brake surfaces are engaged. Hence, in this neutral position of the mechanism the hoisting drum 26 is held against rotation. The light tension spring 42 shown connected to the lever 36 in Figure 1 holds the driving member 45 in this clutch releasing position, said spring not being of sufficient power, however, to exert any appreciable brake releasing action in opposition to the relatively heavy springs 92. In the figures diagrammatically illustrating the three operating positions of the mechanism, Figure 3 represents the neutral position above described.

Figure 4:
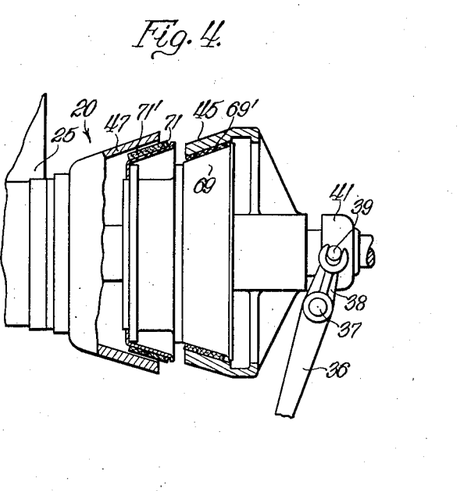

When the operator desires to transmit power to the hoisting drum 26 for raising the load 29, he actuates control lever 33 toward the left, as viewed in Figure 1. This operates through the motion transmitting linkage to shift the thrust collar 41 toward the right, thereby advancing the driving cone 45 toward and into engagement with the cooperating cone 69 on the driven member. In the initial contact between the clutch surfaces $C^1$ and $C^2$ slippage occurs between these surfaces because at this time the driven member 46 is still being held in braking engagement with the brake cone 47. As the shifting motion of the driving cone 45 toward the right is continued, sufficient pressure is built up between the clutch surfaces $C^1$ and $C^2$ to overcome the pressure of the springs 92. Hence, the driven member 46 is picked up and caused to move concurrently with the driving member 45, thereby separating the brake surfaces $B^1$ and $B^2$. By thus having the brake released only after the clutch is engaged, and solely by virtue of the direct pressure of engaging the clutch, there is always the assurance that the hoisting drum will receive the necessary driving energy to raise the load before the braking restraint necessary to sustain the load has been released. This power transmitting relation of the parts is diagrammatically illustrated in Figure 4, which shows the driving cone 45 in engagement with the forward cone 69 of the driving member, and which shows the rearward cone 71 of said driven member out of engagement with the brake cone 47.

The operation of interrupting the transmission of power to the hoisting drum, for bringing the the load to rest at the desired elevated point and holding it there, is accomplished by moving the control lever 33 back to its neutral position. In the return motion of the driving cone 45 toward its neutral position, the cone 69 of the driven member remains clutched thereto, under the action of the springs 92, until the other cone 71 of the driven member engages the brake cone 47. Thereupon, the pressure of the springs 92 is transferred from the clutch surfaces to the brake surfaces, the driving cone 45 continuing to move slightly further toward the left for physically separating the clutch surfaces. Thus, it will be seen that in interrupting the transmission of power to the hoisting drum after a hoisting operation, the necessary braking restraint is imposed on the drum to hold the load before the driving energy necessary to raise the load has been released.

When it is desired to lower the load at a controlled speed, governed by the brake surfaces of the mechanism, the operator pushes the control lever 33 forward from the neutral position shown in Figure 1. This causes the driving member 45 to be shifted toward the left from its neutral position, whereby the thrust bearing 61 transmits thrusting movement to the inner ends of the brake control levers 95. The resulting rocking motion of said levers operates through the pull rods 96 to draw the cone 71 of the driven member out of engagement with the brake cone 47 against the action of the springs 92. This can be performed very gradually and the reverse rotation of the hoisting drum and of the driven member 46 can be accurately controlled by maintaining any desired degree of braking contact between the driven cone 71 and the brake drum 47. The shifting of the driving cone 45 to the left in this operation of releasing the brake surfaces increases the spacing between the driving cone and the clutch cone 69 of the driven member, so that no clutch engagement can occur at this time. This relation of the parts is diagrammatically illustrated in Figure 5.

Figure 6:
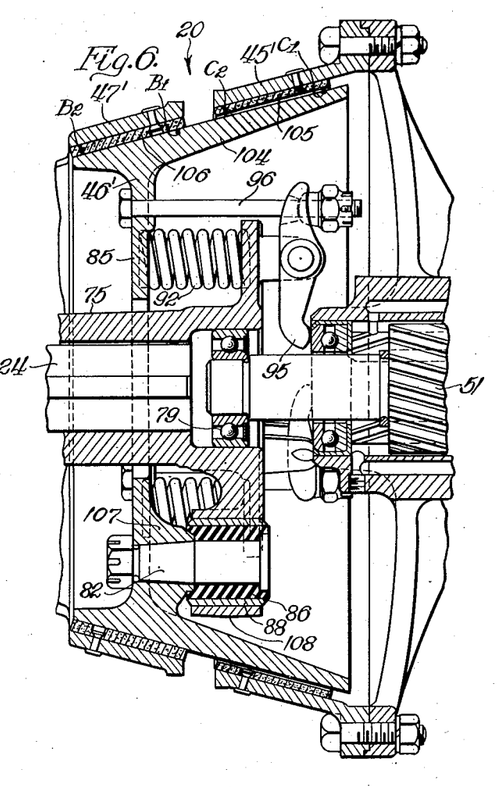
Figures 6 and 7 are fragmentary axial sectional views of other embodiments.

Referring now to the modified construction illustrated in Figure 6, this modified embodiment differs from the previously described embodiment principally in that the driven element 46' is constructed in the form of a single continuous cone 104 having its opposite end portions cooperating with the driving and brake cones 45' and 47'. That is to say, the larger end of the cone 104 constitutes a driven clutch surface C² for cooperating with the driving clutch surface C¹ of the driving cone, and the smaller end of the driven cone 104 constitutes a driven brake surface B² for cooperating with the stationary brake surface B¹ of the brake cone. In this construction, the friction facings 105 and 106 are shown as being secured to the driving and brake cones 45' and 47' respectively, although it will be understood that these renewable friction facings may be secured to the driven cone 104 instead. In this embodiment, as well as in the embodiment of Figure 2, the driving and brake cones 45' and 47' may be split longitudinally into two or more sections, if desired, so as to facilitate ready removal of these cones for renewing the friction facing material. In this modified embodiment illustrated in Figure 6, the arrangement of the studs 82 and resilient bushings 86 is reversed to that shown in Figure 2, the studs 82 being secured in bosses 107 projecting from the web portion 85, and the sleeves 88 of the resilient bushings being slidably mounted in tubular bosses 108 carried by the supporting member 75. Either arrangement may be employed in either embodiment, as desired, although the arrangement illustrated in Figure 6 is advantageous in that it facilitates disposing the resilient bushings directly in the transverse plane of the pilot bearing 79. By virtue of such relation, any flexure in the rubber bushings resulting from angular misalignment of the cones is caused to act more in a direction extending substantially longitudinally of the bushings than transversely thereof. The operation of engaging and releasing the clutch surfaces and brake surfaces in starting and stopping the transmission of power to the driven member and in permitting reverse rotation of the driven member at a controlled speed will be apparent from the preceding description of the operation of the construction shown in Figure 2.

Figure 7:
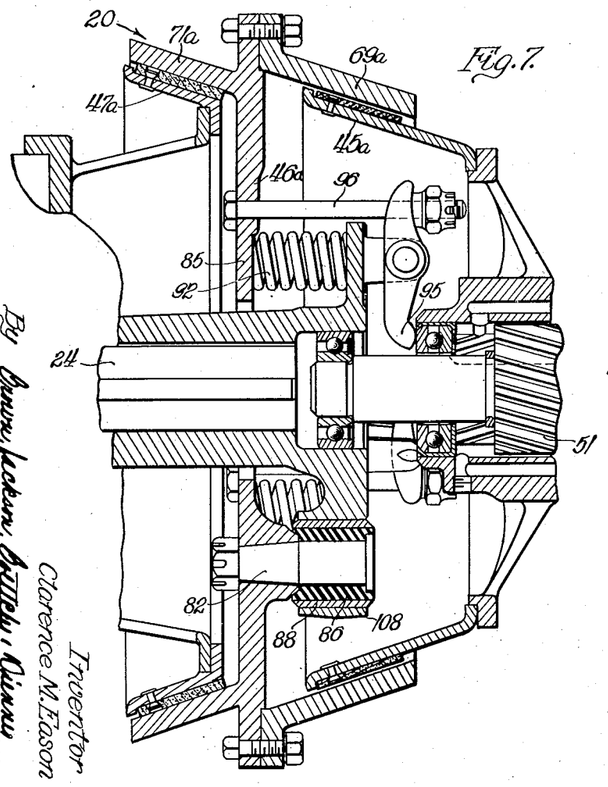

Referring now to the modified embodiment illustrated in Figure 7, in this construction the relation of the cones is reversed, the driven cones being disposed outermost in the form of female cones, and the clutch and brake cones 45ᵃ and 47ᵃ being disposed innermost in the form of male cones. The female cone 71ᵃ which is adapted to engage the brake cone 47ᵃ is shown as being formed integral with the web 85 of the driven member 46ᵃ, and the female cone 69ᵃ which is adapted to engage the clutch cone 45ᵃ, is shown as being bolted to said web 85, although it will be understood that other suitable assembly arrangements may be employed. Either or both of the female cones 69ᵃ and 71ᵃ may be split longitudinally into two or more sections, if desired, so as to permit ready removal of these cones for renewing the friction facing material. The latter may be mounted on the female cones or on the male cones, as desired. The operation of this embodiment is the same as that described of the embodiment illustrated in Figure 2.

In each of the foregoing constructions, the provision of the helically splined driving sleeve 51 enables the clutch surfaces C¹ and C² to be brought into engagement with a smoother, easier motion than if a straight splined connection were employed. With straight splines, the force necessary to slide the driving cone along said splines under torque load may exceed the pressure required to engage the clutch surfaces. Such binding action or high frictional resistance in the shiftable connection may cause a chattering or grabbing action during the operation of engaging the clutch surfaces. This is avoided by the helically splined connection, in which the direction of inclination of the helical splines 52, 53 with respect to the direction of rotation of the driving shaft 21 is such that as soon as the clutch surfaces establish contact, the torque transmitted through said helical splines establishes an axial shifting force which minimizes or eliminates such binding action. The magnitude of the shifting force created by the helical splines may be varied as desired by changing the angle of inclination of the splines. A large angle of inclination establishes a servo action tending to force the clutch surfaces together, but I preferably employ only such angle as will insure that the friction of the torque load will not impede free sliding motion between the splines.

Figure 8:
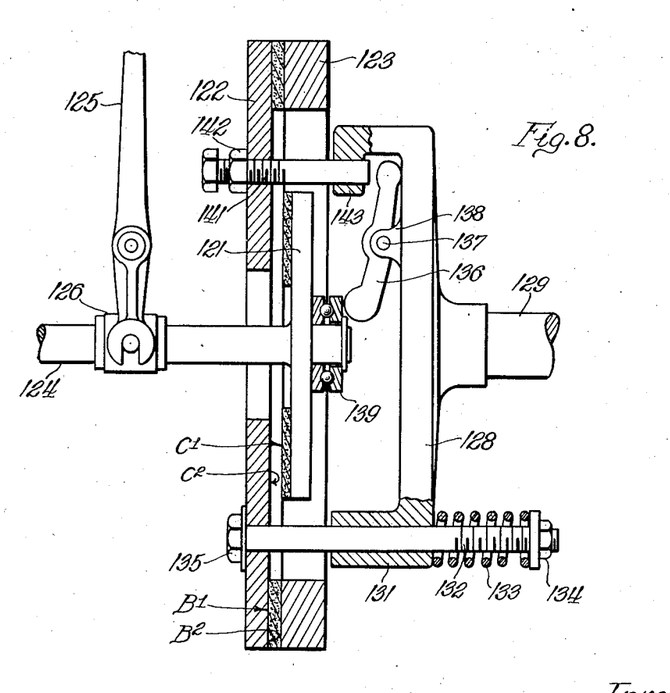
Figure 8 is a schematic outline view showing another embodiment using discs instead of cones.

Figure 8 illustrates in schematic outline another embodiment of the invention wherein the driving, driven and brake members are in the form of discs having substantially flat contacting surfaces. The driving disc is indicated at 121, the driven disc at 122 and the brake disc at 123. In the schematic form illustrated, the driving disc 121 is mounted directly on a shiftable drive shaft 124 which is adapted to be shifted through the medium of a control lever 125 operatively connected with the shaft through a shifter collar 126 rotatably mounted on the shaft. It will be understood, of course, that the above described construction employing a shiftable hub coacting with a splined driving sleeve may be employed in this construction if desired. The coacting clutch surfaces of the driving and driven members are indicated at C¹ and C², and the coacting brake surfaces of the brake and driven members are indicated at B¹ and B², and in each instance one of these surfaces preferably consists of a renewable friction facing material.

The driven member 122 is shiftably mounted on a spider or supporting member 128 which is fixedly secured to the driven shaft 129. Guide bosses 131 are provided at a plurality of angularly spaced points around the spider or supporting member 128, and slidably mounted in said bosses are rods 132. Compression springs 133 are mounted on these rods, one end of each spring bearing against the supporting member 128 and the other end abutting a nut 134 screwing over the end of its associated rod. The opposite ends of said rods have any suitable tension transmitting connection with the driven member 122, such as by the nuts 135. The pressure of the springs 133 normally tends to hold the brake surface $B^2$ of the driven member in engagement with the brake surface $B^1$ of the brake member 123. Said brake member has any suitable fixed attachment to a stationary supporting member. A plurality of levers 136 are mounted on the supporting member 128 at angularly spaced points of the latter, these levers being mounted on pivot pins 137 carried in lugs 138 projecting from the inner side of the supporting member. The inner ends of said levers are adapted to have motion imparted thereto by the outer race of an anti-friction thrust bearing 139 carried by the shiftable drive shaft 124. The outer ends of said levers are adapted to impart motion to thrust pins or bolts 141 which have adjustable threaded mounting in the driven member 122, said pins or bolts being held in any adjusted position by the lock nuts 142. If desired, the inner ends of said pins may be guided in bosses 143 carried by the supporting member 128.

Figure 9:
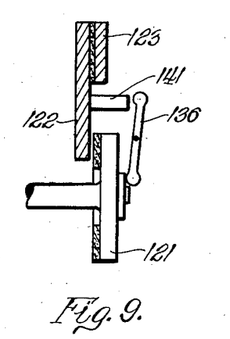
Figures 9, 10 and 11 are diagrammatic views illustrating the operation of the latter embodiment.
Figure 10:
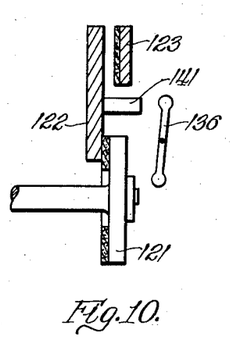
Figure 11:
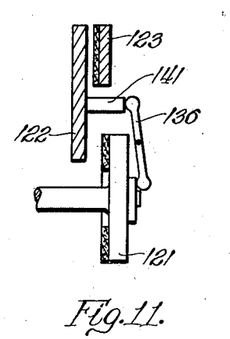

In the neutral position of the control lever 125, the clutch surfaces $C^1$ and $C^2$ are disengaged, but the brake surfaces $B^1$ and $B^2$ are held in engagement by the springs 133, whereby the driven member 122 is held against rotation. This neutral position of the parts is diagrammatically illustrated in Figure 9. To transmit power to the driven member 122, the control lever 125 is actuated to shift the driving member 121 into clutching engagement with the driven member, the pressure of said clutching engagement imparting concurrent shifting movement to the driven member against the action of the springs 133 and causing the brake surfaces $B^1$ and $B^2$ to separate. Thus, as described in the preceding embodiments, the brake surfaces are released only after the clutch surfaces are engaged, and solely by virtue of the direct pressure of engaging the clutch surfaces. Such power transmitting position of the parts is diagrammatically illustrated in Figure 10. In the operation of interrupting the transmission of power, the clutch surfaces $C^1$ and $C^2$ remain engaged during the return motion of the driven member until the brake surfaces $B^1$ and $B^2$ become engaged, whereupon the clutch surfaces separate. Thus, the driven member is continuously maintained in contact either with the driving member or with the brake member in the operations of starting and stopping the transmission of power to the driven shaft 129. When it is desired to release the brake surfaces independently of the engagement of the clutch surfaces, as for permitting reverse rotation of the driven shaft 129, the driving member 121 is shifted toward the right from its neutral position for imparting rocking motion to the levers 136. Such motion is transmitted through the pins 141 for shifting the driven member 122 laterally away from the brake member 123. This shifting motion can be performed gradually for maintaining control of the reverse rotation of the driven shaft 129. Such position of the parts is diagrammatically illustrated in Figure 11.

Figures 12, 13, 14:
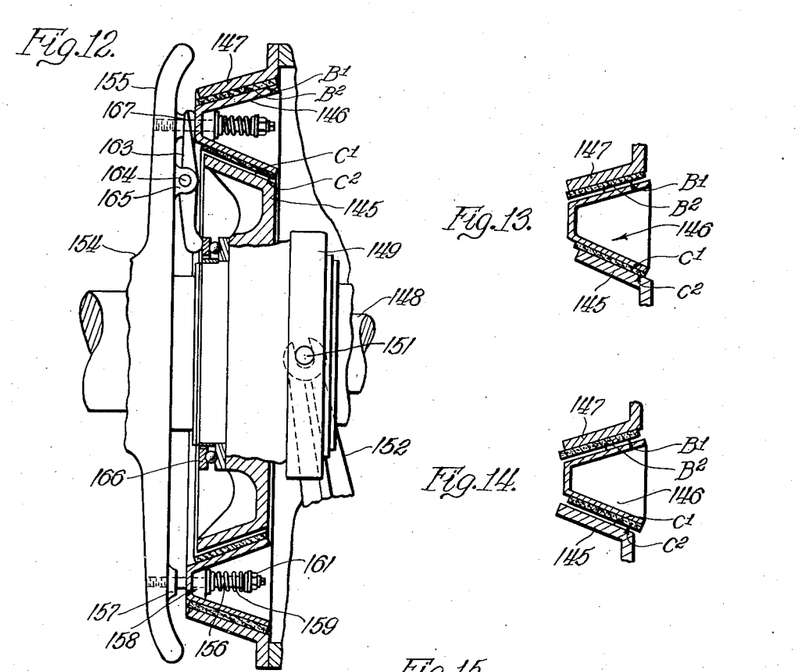
Figure 12 is a schematic view showing another embodiment in which the driving, driven and brake members are nested in substantially the same transverse plane.
Figures 13 and 14 are diagrammatic views illustrating the operation of the latter embodiment.

In Figure 12 I have illustrated, more or less diagrammatically, another modified construction in which the driving, driven and brake members are nested or grouped, one within the other, so that they all lie in substantially the same transverse plane. This reduces the overall length of the clutch and brake mechanism, which is an advantageous feature for certain types of hoists and winches. The driving member is in the form of a shiftable male cone 145, the driven member is in the form of a ring or annulus 146 of wedge-shaped cross section, and the brake member is in the form of an outer stationary cone 147 having its direction of conical taper reversed to that of the driving cone 145. The clutch surfaces consist of the coacting conical surfaces $C^1$ and $C^2$ of the driving and driven members 145 and 146, and the brake surfaces consist of the coacting conical surfaces $B^1$ and $B^2$ of the brake and driven members 147 and 146. In each instance, one of these surfaces may consist of a lining or layer of renewable friction facing material. The driving cone 145 receives power from a drive shaft or sleeve 148, and is arranged for axial shifting movement through the medium of a helically splined connection, as previously described, or through shifting movements imparted to the driving shaft. A shifter collar for shifting the driving element is indicated at 149, this collar carrying trunnion pins 151 engaging in the fork arms of a shifter yoke 152.

The driven member 146 has shiftable mounting on any desired form of driven element. In the illustrative embodiment shown, the driven element consists of a cable drum 154, the conical driven member 146 being shiftably mounted on one end wall or flange 155 of this drum. The mounting is established through a plurality of angularly spaced studs 156 which have threaded inner ends screwing into bosses 157 projecting from the adjacent face of the drum flange 155. The driven member 146 is formed with guide bosses 158 which have free sliding movement over the studs 156. Mounted on the other end of each stud is a compression spring 159 which bears at one end against the guide boss 158 and at its other end against a nut 161 screwing over the end of the stud. The pressure of the springs 159 tends to shift the driven member 146 toward the left along the studs 156 for yieldingly holding the outer conical surface $B^2$ of the driven member against the inner conical surface $B^1$ of the brake member 147.

Also mounted on the adjacent end flange 155 of the cable drum are a plurality of levers 163, supported intermediate their ends on pivot pins 164 carried in lugs 165 projecting from the drum flange 155. Mounted on the adjacent end of the hub portion of the shiftable driving member 145 is a thrust bearing 166 which is adapted to impart motion to the inner ends of the levers 163 when the driving member 145 is shifted toward the left from its neutral position. The outer ends of said levers are formed with rounded thrusting surfaces 167 adapted to transmit thrusting pressure to the adjacent end surface of the shiftable driven member 146. If desired, each lever 163 may be radially aligned with a guide stud 156, and may have its outer end apertured or forked for embracing said guide stud.

When the control lever 152 is in the neutral position illustrated, the driving member 145 is out of engagement with the driven member 146, but said driven member is in engagement with brake member 147 so that the cable drum 154 is held against rotation. For transmitting power to the cable drum, the control lever 152 is swung toward the right from its neutral position, thus shifting the driving member 145 into engagement with the inner conical surface of the driven member 146. The pressure of establishing clutching engagement between the clutch surfaces C¹ and C² of these two members shifts the driven member 146 toward the right against the pressure of the springs 159, and thereby shifts the outer conical surface of the driven member 146 out of engagement with the stationary brake member 147. This relation of the parts is diagrammatically illustrated in Figure 13. In the reverse operation of interrupting the transmission of power to the hoisting drum, the return motion of the lever 152 back to its neutral position restores contact between the outer conical surface of the driven member and the brake member 147 before the driving member 145 separates from its contact with the inner conical portion of the driven member. Thus, as described of the preceding embodiments, the hoisting drum is never allowed to escape from the driving member or from the brake member in the operations of starting and stopping the transmission of power to the drum.

When it is desired to lower the load at a controlled speed, the control lever 152 is moved toward the left from its neutral position, thereby moving the driving member 145 toward the left. Such motion is transmitted through the thrust bearing 166 to the levers 163 for causing the outer ends of said levers to impart shifting movement to the driven member 146 against the action of the springs 159. Such shifting movement releases the brake contact between the outer conical surface of the driven member and the brake member 147. The degree to which these brake surfaces are released can be controlled through the lever 152 for lowering the load at any desired speed. Such relation of the parts is diagrammatically illustrated in Figure 14.

When it is desired to renew one or both of the friction linings in this construction, the driven member 146 can be removed as a unit from between the driving member 145 and the brake member 147. This can be accomplished by unscrewing the guide studs 156 from the bosses 157 on the cable drum, whereby the driven member, the guide studs and the springs 157 can be removed as a complete assembly; or, if desired, the nuts 161 can be removed from the guide studs, and the springs 159 and driven member 146 slipped endwise off these studs. As an alternative construction, the driven member 146 can also be constructed of a plurality of segmental portions having their ends bolted together. These segmental portions can each be removed individually with its associated guide studs and compression springs by releasing the bolted attachment between the ends of the segments.

Figure 15:
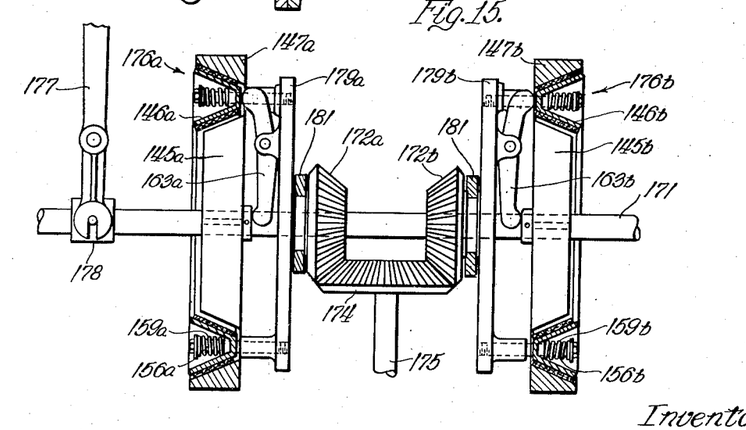
Figure 15 is a schematic outline view showing my improved clutch and brake mechanisms employed for controlling a reversing gear set.

My improved clutch and brake mechanism is not necessarily limited in its utility to the control of a cable drum, but can be employed with decided advantage in numerous other power transmitting situations. In Figure 15 I have diagrammatically illustrated how my improved clutch and brake mechanism can be employed in a reversing gear set to provide pronounced operating advantages in such a gear set. In such construction, power is transmitted through a driving shaft 171 on which are mounted two oppositely disposed driving bevel gears 172ᵃ and 172ᵇ. These driving bevel gears mesh with an intermediate driven bevel gear 174 which is mounted on a driven shaft 175. The forward driving rotation and the backward idling rotation of each driving bevel gear 172ᵃ and 172ᵇ is controlled by an individual clutch and brake mechanism 176ᵃ and 176ᵇ respectively. Any of the previously described embodiments of my invention may be employed as the clutch and brake mechanisms 176ᵃ and 176ᵇ of this reversing gear set. However, the embodiment illustrated in Figure 12 is of advantage in this apparatus because of its short axial dimension, and accordingly I have illustrated such embodiment in the apparatus. In general, the same reference numerals designating the parts in Figure 12 have been employed to designate the corresponding parts in Figure 15, with the letters "a" and "b" appended thereto to differentiate between right and left hand parts. The two driving cones 145ᵃ and 145ᵇ are operatively connected with the driving shaft 171 to rotate continuously therewith. In the control operations, both driving cones 145ᵃ and 145ᵇ are adapted to be shifted concurrently toward the right or toward the left from their neutral positions. The two clutch and brake mechanisms are arranged in reversed relation so that a shifting movement of both driving cones in one direction performs one operation in one mechanism and another operation in the other mechanism, and vice versa. Concurrent shifting movement of both driving cones 145ᵃ and 145ᵇ may be provided for by mounting both cones upon a common shiftable sleeve extending through the gear hubs, or may be provided for by mounting both cones on individual shiftable sleeves and interconnecting these sleeves through an external system of linkage. However, for simplicity of illustration, I have shown the driving shaft 171 as arranged for shifting movement, and have fixedly secured both cones to this shaft. The control movements are imparted to the shaft through a control lever 177 which is operatively connected with the shaft through a shifter collar 178.

The two driving bevel gears 172ᵃ and 172ᵇ are each secured to a supporting member 179ᵃ, 179ᵇ, each such assembly being freely rotatable on the driving shaft 171 but being held against axial movement by any suitable means, as, for example, by the frame bearings diagrammatically indicated at 181, such bearings being interposed between the driving bevel gears 172ᵃ and 172ᵇ and the supporting members 179ᵃ and 179ᵇ. The conical driven members 146ᵃ and 146ᵇ and the actuating levers 163ᵃ and 163ᵇ are mounted on the supporting members 179ᵃ and 179ᵇ in substantially the same manner as described of the mounting of said parts on the drum flange 155 in Figure 12.

The above described construction can be employed in any situation where a reversing gear set is of utility, but the advantages of employing my improved clutch and brake mechanisms for controlling such a gear set are more apparent in situations where the load has considerable inertia or where it is desirable to lock the load against motion after a predetermined degree of movement in either direction, or both. Such load characteristics may be illustrated by the platform and boom of an excavating shovel, or the platform and derrick of a pile driver, each adapted to be rotated horizontally about a lower turn table or king pin mounting, and each adapted to be driven through mechanism which can stop the large inertia of the platform upon the interruption of the driving operation and which can hold the platform locked against motion after being revolved to any desired position. When the control lever 177 stands in its neutral position, both driven members 146ᵃ and 146ᵇ are held pressed into braking contact with their associated brake members 147ᵃ and 147ᵇ by the springs 159ᵃ and 159ᵇ, whereby the driven shaft 175 is locked against rotation through both bevel pinions 172ᵃ and 172ᵇ. Motion of the control lever toward the right from the neutral position shown shifts both driving members 145ᵃ and 145ᵇ toward the left. In the case of the left hand clutch and brake mechanism 176ᵃ, such motion of the driving member engages the clutch surfaces and thereafter releases the brake surfaces through the concurrent shifting motion imparted to the driven member 146ᵃ. In the case of the right hand clutch and brake mechanism 176ᵇ, such shifting motion of the driving member 145ᵇ operates through the levers 163ᵇ to move the driven member 146ᵇ out of braking engagement with the brake member 147ᵇ. In consequence of the foregoing, driving rotation is transmitted through the bevel pinion 172ᵃ to the intermediate bevel gear 174 for driving the driven shaft 175 in one direction, the other bevel pinion 172ᵇ meanwhile revolving idly in a direction of rotation opposite to that of the bevel pinion 172ᵃ. Movement of the control lever 177 back to its neutral position for stopping this direction of rotation of the driven shaft 175 restores both clutch and brake mechanisms to their neutral positions. As before described, when these clutch and brake mechanisms are in their neutral positions the brake surfaces of both are engaged. Hence, the operation of interrupting the transmission of power to the driven shaft 175 imposes braking retardation on the driven shaft substantially simultaneously through both bevel pinions 172ᵃ and 172ᵇ. The fact that the brake function is equally effective for either direction of rotation of the driven members 146ᵃ and 146ᵇ results in the braking stresses being equally borne by each of the two bevel pinions 172ᵃ, 172ᵇ. Motion of the control lever 177 in the opposite direction from its neutral position for transmitting power to the shaft 175 in the opposite direction of rotation merely operates the clutch and brake mechanisms in the reverse order for transmitting power through the bevel pinion 172ᵇ and for permitting idling reverse rotation of the other bevel pinion 172ᵃ.

While I have illustrated and described what I regard to be the preferred embodiments of my invention, nevertheless it will be understood that such are merely exemplary, and that numerous modifications and rearrangements may be made therein without departing from the essence of the invention.

I claim:

1. In combination, a driving member, a driven member, a clutch for operatively connecting these two members together, a brake for the driven member, means whereby setting the aforesaid clutch releases said brake, and means whereby to release the brake only when said clutch is inoperative.

2. In combination, a driving member, a driven member, a clutch for operatively connecting these two members, a brake for the driven member, control means, such interlock between the aforesaid elements that there is no intermediate disengaged condition of the driven member between the two engagements thereof, and means whereby to release the brake only when said clutch is inoperative.

3. In combination, a braking member, a driven member adapted to engage said braking member, a driving member, a clutch for engagement between the driving member and the driven member, means whereby the pressure of said engagement shifts said driven member out of engagement with said braking member, control means for said clutch, and means whereby said control means effects relative separating movement between said braking member and driven member independently of engagement between said driving and driven members.

4. In combination, a driven member, a braking member adapted to hold said driven member against motion in either direction, a driving member, a clutch for engagement between the driving member and the driven member, means whereby the pressure of said engagement shifts said driven member out of engagement with said braking member, control means for said clutch, and means whereby said control means effects relative separating movement between said braking member and driven member independently of engagement between said driving and driven members.

5. In combination, three friction members comprising a driven member, a driving member and a brake member, means to cause engagement of the driven member with one of the other members to release it from the remaining member selectively, and means for releasing the aforesaid engagement of the driven member with the brake member only while said driven member is released from said driving member.

6. In combination, a brake member, a shiftable driven member adapted to engage said brake member, a driving member shiftable into clutching engagement with said driven member and operable by the pressure of said clutching engagement to shift said driven member out of engagement with said brake member, and means whereby shifting of the driving member effects relative separating movement between said brake and driven members independently of clutching engagement between said driving and driven members.

7. In combination, a brake member, a driven member shiftable relatively to said brake member, spring means tending to hold said driven and brake members in cooperative engagement, a driving member shiftable into clutching engagement with said driven member and operable by the pressure of said clutching engagement to shift said driven member out of engagement with said brake member, means for effecting relative separating movement between said brake and driven members independently of clutching engagement between said driving and driven members.

8. In combination, a brake member, a driving member, and a driven member, coacting brake surfaces on said brake and driven members, coacting clutch surfaces on said driving and driven members, two of said members being capable of independent axial shifting motion, and a control lever operative in one direction of movement to cause the shifting motion of said members in such sequence as to first engage said clutch surfaces and to thereafter release said brake surfaces, and operative in the other direction of movement to release said brake surfaces.

9. In clutch and brake mechanism wherein a shiftable driven member normally engages a brake member, and a driving member is shiftable into clutching engagement with said driven member in response to the operation of a control device and is operable by the pressure of said clutching engagement to shift said driven member out of engagement with said brake member, the combination therewith of means responsive to the operation of said control device for effecting relative separating motion between said driven and brake members independently of clutching engagement between said driving and driven members.

10. In combination, driving, driven and brake members, two of said members being capable of independent axial shifting motion, coacting clutch surfaces on said driving and driven members, coacting brake surfaces on said driven and brake members, said brake surfaces being normally in engagement, and a control lever operatively connected to shift said shiftable members whereby one direction of movement of said lever from a neutral position is operative to engage said clutch surfaces and whereby the other direction of movement of the lever from said neutral position is operative to release said brake surfaces.

11. In combination, a pair of axially separable clutch surfaces, a pair of axially separable brake surfaces, spring means normally tending to hold said brake surfaces in engagement, and a control lever operative in one direction of movement from a neutral position to first engage said clutch surfaces and to thereafter release said brake surfaces, and operative in the other direction of movement from said neutral position to release said brake surfaces independently of engagement of said clutch surfaces.

12. In combination, axially alined driving, driven and brake members, two of said members being capable of independent axial shifting motion, and mechanically operated control means for engaging and releasing said members comprising a lever rotating with said driven member and operative to impart axial shifting motion to said driven member.

13. In combination, a brake member, a rotatable mounting member, a driven member shiftably supported on said mounting member, spring means tending to shift said driven member into engagement with said brake member, a driving member shiftable into clutching engagement with said driven member, and mechanically operated control means for engaging and releasing said members comprising a lever pivotally supported on said mounting member and operative to impart axial shifting motion to said driven member.

14. In combination, a brake member, a shiftable driven member adapted to engage said brake member, a driving member shiftable in one direction from neutral position into clutching engagement with said driven member and operable by the pressure of said clutching engagement to shift said driven member out of engagement with said brake member, and a lever responsive to shifting motion of said driving member in the other direction from neutral position for causing relative separating movement between said driven and brake members.

15. In combination, a brake member, a rotatable mounting member, a driven member shiftably supported on said mounting member, spring means operative between said mounting member and said driven member tending to shift said driven member into engagement with said brake member, a driving member shiftable in one direction from neutral position into clutching engagement with said driven member and operable by the pressure of said clutching engagement to shift said driven member out of engagement with said brake member, a lever pivotally mounted on said mounting member and adapted to be actuated by said driving member when the latter is shifted in the other direction from neutral position, and means connecting said lever with said driven member for causing the latter to separate from said brake member when the lever is actuated.

16. In clutch and brake mechanism of the class described, the combination of a brake member, a shiftable driven member adapted to engage said brake member, a driving member shiftable into clutching engagement with said driven member and operable by the pressure of said clutching engagement to shift said driven member out of engagement with said brake member, a supporting member for said driven member, and yieldable mounting means for permitting yieldable angular movement between said driven member and said supporting member.

17. In clutch and brake mechanism of the class described, the combination of a brake cone, a shiftable driven cone adapted to engage said brake cone, a driving cone shiftable into clutching engagement with said driven cone and operable by the pressure of said clutching engagement to shift said driven cone out of engagement with said brake cone, a supporting member for said driven cone, and rubber mounting devices for resiliently mounting said driven cone on said supporting member.

18. In clutch and brake mechanism of the class described, the combination of a brake member, a shiftable driven member adapted to engage said brake member, a driving member shiftable into clutching engagement with said driven member and operable by the pressure of said clutching engagement to shift said driven member out of engagement with said brake member, a driving shaft for said driving member, and means operatively connecting said shaft with said driving member whereby torque transmitted to said driving member exerts a shifting force on said driving member.

19. In clutch and brake mechanism of the class described, the combination of a brake cone, a shiftable driven cone adapted to engage said brake cone, a driving cone shiftable into clutching engagement with said driven cone and operable by the pressure of said clutching engagement to shift said driven cone out of engagement with said brake cone, a driving shaft for said driving cone, and an inclined spline operatively connecting said driving shaft with said driving cone whereby torque transmitted through said spline exerts a shifting force on said driving cone.

20. In a controllable driving and braking unit, the combination of a driving member having a friction surface, a driven member having a friction surface to cooperate with the friction surface of said driving member, said surfaces being engageable and disengageable by relative motion toward and away from each other, a brake member having a friction surface, said driven member having a friction surface cooperating with the friction surface of the brake member, means tending to move the last two surfaces into engagement, means operable to move the first two surfaces into cooperative engagement to cause driving of the driven member without friction braking and to produce braking action between said last two surfaces before the first two can disengage, and means operable only when the first two surfaces are separated for engaging and disengaging the last two surfaces only.

21. In combination, a brake member, a driving member, and a driven member, substantially flat coacting brake surfaces on said brake and driven members, substantially flat coacting clutch surfaces on said driving and driven members, two of said members being capable of independent axial shifting motion, and control mechanism therefor comprising a control lever operative in one direction of movement from a neutral position to cause the shifting motion of said members in such sequence as to first engage said clutch surfaces and to thereafter release said brake surfaces, and operative in the other direction of movement from neutral position to release said brake surfaces.

22. In clutch and brake mechanism, the combination of inner and outer members having reversely sloped conical surfaces, an intermediate wedge-shaped member adapted to engage said conical surfaces, two of said members being capable of independent axial shifting movement, and control means operative by shifting movement of one of said members in one direction to effect shifting movement of another of said members in the opposite direction.

23. In a reversing gear set, the combination of a drive shaft, a pair of oppositely disposed driving bevel pinions adapted to be driven by said shaft, an intermediate bevel gear adapted to be driven by said pinions, a control lever, and a clutch and brake mechanism for each bevel pinion controlled by said lever, and operative when said lever is actuated in either direction from its neutral position to clutch one or the other of said bevel pinions to said drive shaft and operative when said lever is in its neutral position to hold both of said pinions against rotation, the clutch and brake mechanism for one of said bevel pinions comprising a pair of coacting clutch surfaces, a pair of normally engaging coacting brake surfaces, and means establishing an interdependent relation between said surfaces whereby in starting the transmission of power through said pinion the release of said brake surfaces is made dependent upon the prior engagement of said clutch surfaces.

24. In a reversing gear set, the combination of a drive shaft, a pair of oppositely disposed driving bevel pinions adapted to be driven by said shaft, an intermediate bevel gear adapted to be driven by said pinions, and clutch and brake mechanism for each bevel pinion operative to apply simultaneous braking force to said pinions or to selectively transmit power from said shaft to either one of said pinions, the clutch and brake mechanism for one of said pinions comprising an operating relation of the clutch and of the brake which, in one control operation, positively precludes release of the brake until after the engagement of the clutch.

25. In combination, a drive shaft, a pair of members adapted to be driven by said shaft, a control lever, and axially shiftable clutch and brake surfaces for each member controlled by said lever and operative when said lever is actuated in either direction from its neutral position to clutch one or the other of said members to said drive shaft, and operative when said lever is in its neutral position to hold both of said members against motion.

26. In combined clutch and brake mechanism, the combination of a pair of coacting clutch surfaces, a pair of normally engaging, coacting brake surfaces, means establishing an interdependent relation between said surfaces whereby in starting the transmission of power the release of said brake surfaces is made dependent upon the prior engagement of said clutch surfaces and whereby in interrupting the transmission of power the release of said clutch surfaces is made dependent upon the prior engagement of said brake surfaces, and means for releasing said brake surfaces independently of the engagement of said clutch surfaces.

27. In combination, a driving member, a driven member, and a brake member, said driven member and said brake member normally having a braking relation established therebetween for preventing rotation of said driven member in one direction, means for establishing a clutching relation between said driving member and said driven member and operative automatically in response to said clutching relation to render said braking relation non-effective, and means for rendering said braking relation non-effective independently of the establishment of said clutching relation.

28. In mechanism of the class described, the combination of a driving member, a driven member, and a brake member, said driven member and said brake member normally having a braking relation established therebetween for preventing rotation of said driven member in one direction, control means functioning independently of the speed of said driving member for establishing a clutching relaton between said driving member and said driven member and operative automatically in response to said clutching relation to render said braking relation non-effective, one of said members being shiftable, and means responsive to torque in said mechanism for exerting a shifting force on said member.

29. In mechanism of the class described, the combination of driving, driven and brake members, coacting clutch means adapted to establish a clutching relation between said driving and driven members, coacting brake means adapted to establish a braking relation between said driven and brake members, control means functioning independently of the speed of said driving member for establishing said clutching and braking relations, and means utilizing torque effective in said mechanism for assisting one of the control operations of said mechanism.

30. In mechanism of the class described, the combination of driving, driven and brake members, control means for causing clutching engagement between said driving and driven members and for causing braking engagement between said driven and brake members, one of said members being arranged for shifting movement in the control of said mechanism, and means for preventing the torque imposed on said shiftable member from binding the shifting movement of said member.

31. In mechanism of the class described, the combination of driving, driven and brake members, control means for causing clutching engagement between said driving and driven members and for causing braking engagement between said driven and brake members, one of said members being arranged for shifting movement in the control of said mechanism, and yieldable means in torque transmitting relation to said shiftable member adapted to accommodate shifting movement of said member by flexure of said yieldable means.

32. In mechanism of the class described, the combination of driving, driven and brake members, control means for causing clutching engagement between said driving and driven members and for causing braking engagement between said driven and brake members, one of said members being arranged for shifting movement in the control of said mechanism, and a rubber bushing in torque transmitting relation to said shiftable member adapted to accommodate shifting movement of said member by flexure of said bushing.

33. In mechanism of the class described, the combination of an axially shiftable driving member, an axially shiftable driven member and a stationary brake member, coacting clutch surfaces on said driving and driven members, coacting brake surfaces on said driven and brake members, means establishing an interdependent relation between said surfaces whereby in starting the transmission of power the release of said brake surfaces is made dependent upon the prior engagement of said clutch surfaces and whereby in interrupting the transmission of power the release of said clutch surfaces is made dependent upon the prior engagement of said brake surfaces, and means for releasing said brake surfaces independently of the engagement of said clutch surfaces.

34. In a gear set of the class described, the combination of two oppositely facing bevel gears, an intermediate bevel gear meshing with both of said oppositely facing bevel gears, and clutch and brake mechanism for one of said bevel gears comprising a pair of coacting clutch surfaces, a pair of coacting brake surfaces, and means establishing an interdependent relation between said surfaces whereby in one control operation of said mechanism the release of one pair of surfaces is made dependent upon the prior engagement of the other pair of surfaces.

35. In clutch and brake mechanism, the combination of a driving member, a driven member and a brake member nested concentrically in substantially the same transverse plane, coacting clutch surfaces on said driving and driven members, coacting brake surfaces on said driven and brake members, means establishing an interdependent relation between said surfaces whereby in starting the transmission of power the release of said brake surfaces is made dependent upon the prior engagement of said clutch surfaces and whereby in interrupting the transmission of power the release of said clutch surfaces is made dependent upon the prior engagement of said brake surfaces, and means for releasing said brake surfaces independently of the engagement of said clutch surfaces.

36. In clutch and brake mechanism, the combination of a shiftable driving member, a shiftable driven member and a brake member disposed in substantially the same transverse plane, spring means tending to hold said driven member in engagement with said brake member to establish a braking relation, means for establishing a clutching relation between said driving member and said driven member and operative automatically in response to said clutching relation to render said braking relation non-effective, and means for rendering said braking relation non-effective independently of the establishment of said clutching relation.

37. In combined clutch and brake mechanism, the combination of a pair of coacting clutch surfaces, a pair of coacting brake surfaces, and control mechanism comprising means establishing an interdependent relation between said surfaces whereby in starting the transmission of power the release of said brake surfaces is made dependent upon the prior engagement of said clutch surfaces and whereby in interrupting the transmission of power the release of said clutch surfaces is made dependent upon the prior engagement of said brake surfaces, said control mechanism including means responsive to torque for transmitting shifting force to one of said surfaces, and means for releasing said brake surfaces independently of the engagement of said clutch surfaces.

38. In combined clutch and brake mechanism, the combination of driving, driven and brake members, one of said members being shiftable, said driving and driven members having coacting clutch surfaces, said driven and brake members having coacting brake surfaces, means establishing an interdependent relation between the parts whereby in starting the transmission of power the release of said brake surfaces is made dependent upon the prior engagement of said clutch surfaces and whereby in interrupting the transmission of power the release of said clutch surfaces is made dependent upon the prior engagement of said brake surfaces, and means for releasing said brake surfaces independently of the engagement of said clutch surfaces.

CLARENCE M. EASON.